United States Patent [19]

Yoshikawa et al.

[11] Patent Number: 5,363,468
[45] Date of Patent: Nov. 8, 1994

[54] FIBER OPTIC ROD AND PRODUCTION THEREOF

[75] Inventors: Eiichiro Yoshikawa; Koji Yamamoto; Hiroshi Kawashima; Mika Anzai, all of Kobe, Japan

[73] Assignee: Kabushiki Kaisha Kobe Seiko Sho, Kobe, Japan

[21] Appl. No.: 142,074

[22] Filed: Oct. 28, 1993

[30] Foreign Application Priority Data

Oct. 28, 1992 [JP] Japan ................................. 4-290294
Nov. 30, 1992 [JP] Japan ................................. 4-320562

[51] Int. Cl.$^5$ ................................................ G02B 6/16
[52] U.S. Cl. ...................................... 385/145; 385/128; 385/141; 427/163.2; 430/286; 526/89; 526/208
[58] Field of Search ................ 385/123, 126, 127, 128, 385/141, 143, 145; 427/163; 430/281, 286, 287, 288; 526/72, 89, 201, 202, 203, 208

[56] References Cited

U.S. PATENT DOCUMENTS

| | | | |
|---|---|---|---|
| 4,902,727 | 2/1990 | Aoki et al. | 522/90 |
| 5,024,507 | 6/1991 | Minns et al. | 385/145 |
| 5,042,907 | 8/1991 | Bell et al. | 385/123 |

*Primary Examiner*—John D. Lee
*Attorney, Agent, or Firm*—Oblon, Spivak, McClelland, Maier & Neustadt

[57] ABSTRACT

Disclosed herein is a fiber optic rod having good mechanical properties (such as tensile strength and tensile modulus) and good water resistance and a process for producing the same. The fiber optic rod is formed by impregnating, followed by curing, a fibrous reinforcement with a resin composition composed of epoxy (meth)acrylate oligomer and xylene-formaldehyde resin, or epoxy (meth)acrylate oligomer and acid anhydride-modified epoxy (meth)acrylate (which is obtained by modifying epoxy (meth)acrylate oligomer with an organic acid intramolecular anhydride) as curable components and a reactive diluent of monofunctional and/or multifunctional (meth)acrylate and ultraviolet-sensitive polymerization initiator as essential components.

14 Claims, No Drawings

FIBER OPTIC ROD AND PRODUCTION THEREOF

BACKGROUND OF THE INVENTION

1. Field of the Invention

The present invention relates to a fiber optic rod (FOR) and a process for production thereof, said fiber optic rod having high strength and toughness and good moisture resistance owing to the combination of a specific impregnating resin and fibrous reinforcement.

2. Description of the Related Art

An optical fiber cable is provided with a reinforcement which is formed by pultrusion of a composite of fibrous material and thermosetting resin or by covering with a composite of ultraviolet transmitting material and ultraviolet curable resin, followed by ultraviolet curing.

An improvement on the former is disclosed in Japanese Patent Laid-open No. 90229/1987. According to the disclosure, the process consists of impregnating a reinforcing material with a thermosetting resin, covering the impregnated reinforcing material with a thermoplastic resin, heat-curing the thermosetting resin, and removing the covering of the thermoplastic resin. The process permits a much higher production rate than the conventional pultrusion method. On the other hand, it needs additional steps for covering with a thermoplastic resin and removing it after curing. These additional steps need complicated production facilities and hinder high-speed production.

Japanese Patent Laid-open No. 225563/1988 discloses the use of an ultraviolet curable resin as a covering material of optical fiber cables. However, no one has reported using a composite of ultraviolet curable resin and fiber as a reinforcement of optical fiber cables.

Among typical ultraviolet curable resins are epoxy resins and (meth)acyrlic resins. The former are poor in productivity due to slow ultraviolet curing. The latter are poor in adhesion to the reinforcing fiber and have a large cure shrinkage. Both are inferior in performance to the composite reinforcement of heat-curable type.

SUMMARY OF THE INVENTION

The present invention was completed to address the above-mentioned problems involved in the prior art technology. It is an object of the present invention to provide a fiber optic rod having high strength and good moisture resistance owing to a curable resin which exhibits good curing characteristics when combined with a fibrous reinforcement, shrinks only a little at the time of curing, and firmly adheres to the fibrous reinforcement. It is another object of the present invention to provide a process for producing such high-performance fiber optic rod efficiently.

The present invention is embodied in a fiber optic rod which comprises an ultraviolet transmitting fibrous reinforcement impregnated, followed by curing, with a resin composition (I) composed of, as essential components, (a) 40–70 parts by weight of epoxy (meth)acrylate oligomer, (b) 60–30 parts by weight of reactive diluent of monofunctional and/or multifunctional (meth)acrylate, (c) 5–20 parts by weight of xylene-formaldehyde resin, and (d) 1–10 parts by weight (for 100 parts by weight of the total amount of (a), (b), and (c) of ultraviolet-sensitive polymerization initiator.

The present invention is embodied also in a fiber optic rod which comprises an ultraviolet transmitting fibrous reinforcement impregnated, followed by curing, with a resin composition (II) composed of, as essential components, ($a_1$) 30–70 parts by weight of acid anhydride-modified epoxy (meth)acrylate obtained by reaction between epoxy (meth)acrylate oligomer and organic acid intra-molecular anhydride, (b) 70–30 parts by weight of reactive diluent of monofunctional and/or multifunctional (meth)acrylate, (d) 1–10 parts by weight (for 100 parts by weight of the total amount of ($a_1$) and (b)) of ultraviolet-sensitive polymerization initiator.

The present invention is embodied also in a process for producing a fiber optic rod which comprises impregnating an ultraviolet transmitting fibrous reinforcement with a resin composition (I) composed of, as essential components, (a) 40–70 parts by weight of epoxy (meth)acrylate oligomer, (b) 60–30 parts by weight of reactive diluent of monofunctional and/or multifunctional (meth)acrylate, (c) 5–20 parts by weight of xylene-formaldehyde resin, and (d) 1–10 parts by weight (for 100 parts by weight of the total amount of (a), (b), and (c)) of ultraviolet-sensitive polymerization initiator, and curing the resin composition by irradiation with ultraviolet rays.

The present invention is embodied also in a process for producing a fiber optic rod which comprises impregnating an ultraviolet transmitting fibrous reinforcement with a resin composition (II) composed of, as essential components, ($a_1$) 30–70 parts by weight of acid anhydride-modified epoxy (meth)acrylate obtained by reaction between epoxy (meth)acrylate oligomer and organic acid intra-molecular anhydride, (b) 70–30 parts by weight of reactive diluent of monofunctional and/or multifunctional (meth)acrylate, (d) 1–10 parts by weight (for 100 parts by weight of the total amount of ($a_1$) and (b)) of ultraviolet-sensitive polymerization initiator, and curing the resin composition by irradiation with ultraviolet rays.

DETAILED DESCRIPTION OF THE INVENTION

The fiber optic rod of the present invention is formed by impregnating, followed by curing, a fibrous reinforcement with a resin composition (I) composed of (a) epoxy (meth)acrylate oligomer, (b) reactive diluent of monofunctional and/or multifunctional (meth)acrylate, (c) xylene-formaldehyde resin, and (d) ultraviolet-sensitive polymerization initiator. The present invention requires that the epoxy (meth)acrylate oligomer and xylene-formaldehyde resin, as the essential components (a) and (c), be used in specific amounts so that the fiber optic rod (designated as A) has good mechanical properties (such as tensile strength and tensile modulus) and good water resistance owing to low curing shrinkage and good adhesion to the fibrous reinforcement.

The fiber optic rod of the present invention is also formed by impregnating, followed by curing, a fibrous reinforcement with a resin composition (II) composed of (a₁) acid anhydride-modified epoxy (meth)acrylate oligomer, (b) reactive diluent of monofunctional and/or multifunctional (meth)acrylate, and (d) ultraviolet-sensitive polymerization initiator. The present invention requires that the acid anhydride-modified epoxy (meth)acrylate oligomer, as the essential component ($a_1$), be used so that the fiber optic rod (designated as B) has good mechanical properties (such as tensile strength and tensile modulus) and good water resistance owing to low curing shrinkage and good adhesion to the fibrous reinforcement.

The process of the present invention consists of impregnating an ultraviolet transmitting fibrous reinforcement with a resin composition (I) composed of the above-mentioned components (a), (b), (c), and (d), or a resin composition (II) composed of the above-mentioned components ($a_1$), (b), and (d), and subsequently curing the resin composition by irradiation with ultraviolet rays. This process permits efficient production of the high-performance fiber optic rod (A) or (B) in a reduced curing time.

The following is a detailed description of the process for producing the fiber optic rod (A).

The fiber optic rod (A) is made with the resin composition (I) which contains an epoxy (meth)acrylate oligomer as component (a). This oligomer is formed by adding (meth)acrylic acid to an epoxy compound. It has two or more (meth)acryloyl groups in the molecule and a number-average molecular weight of about 500–5000. The epoxy compound includes bisphenol-A type epoxy compounds and hydrogenated or modified products thereof, epoxy compounds of (poly)alkyleneglycol, and novolak-type epoxy compounds.

The reactive diluent of monofunctional and/or multifunctional (meth)acrylate as the component (b) functions as a diluent (or solvent) in the resin composition before curing and, upon irradiation with ultraviolet rays, copolymerizes with the epoxy (meth)acrylate oligomer as the component (a) to form a component of the cured product. It should meet the requirements for low viscosity to promote the impregnation of the resin composition, small cure shrinkage, and ability to give a high-strength cured product.

Preferred examples of the monofunctional (meth)acrylate include (meth)acrylate esters of monohydric alcohol (such as isoamyl alcohol, isooctyl alcohol, lauryl alcohol, stearyl alcohol, methoxydipropylene glycol, phenoxyethyl alcohol, phenoxypropylene glycol, and isobornyl alcohol), mono(meth)acrylate esters of polyhydric alcohol (such as ethylene glycol, polyethylene glycol, propylene glycol, and polypropylene glycol), and (meth)acryloyloxyethyl phthalic acid.

Preferred examples of the multifunctional (meth)acrylate include (meth)acrylate diesters of diol (such as polyalkylene glycol, 1,4-butanediol, 1,6-hexanediol, 1,9-nonanediol, dimethyloltricyclodecane, and neopentylglycol), (meth)acrylates formed by reaction between two or more (meth)acrylic acids and dihydric or polyhydric alcohol (such as trimethylolpropane, pentaerythritol, and dipentaerythritol), and alkoxy-modified products thereof.

These monofunctional and/or multifunctional (meth)acrylates may be used alone or in combination with one another.

The xylene-formaldehyde resin as component (c) reduces cure shrinkage and improves adhesion to the fibrous reinforcement. It is an oligomer formed by addition and condensation of m-xylene and formaldehyde. It should preferably have a number-average molecular weight of about 250–700. In addition, it should preferably be of nonsolvent type having good miscibility with the epoxy (meth)acrylate oligomer as component (a). Its oxygen content is not essential.

The ultraviolet-sensitive polymerization initiator as component (d) is not specifically limited so long as it generates radicals by cleavage upon irradiation with ultraviolet rays. Its common examples include benzoin, benzoin alkyl ether, 2,2-dimethoxy-2-phenylacetophenone, phenoxydichloroacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, benzophenone, benzoylbenzoic acid, hydroxybenzophenone, thioxanthone, 2-chlorothioxanthone, 2,4-dimethylthioxanthone, isopropylthioxanthone, acylphosphine oxide, phenanthrene quinone, camphorquinone, and anthraquinone.

The ultraviolet-sensitive polymerization initiator as component (d) may be used in combination with an adequate amount of ultraviolet sensitizer so as to increase the reaction rate.

The resin composition (I) is composed of the above-mentioned essential four components; but it may contain an additional resin such as epoxy resin, acrylic resin, and silicone resin in an amount not harmful to the curing performance and the properties of the cured product. Such additional resins should be miscible with the components (a), (b), and (c) so as not to aggravate the properties of the cured product.

The fiber optic rod (A) is produced by impregnating an ultraviolet transmitting fibrous reinforcement with the resin composition (I) composed essentially of 40–70 parts by weight of component (a), 60–30 parts by weight of component (b), 5–20 parts by weight of component (c), and 1–10 parts by weight of component (d) for 100 parts by weight of the total amount of components (a), (b), and (c), and integrally curing the resin composition by irradiation with ultraviolet rays. Examples of the fibrous reinforcement include glass fiber, polyolefin fiber, polyacrylate fiber, nylon fiber, and aramide fiber, which are not limitative.

With an insufficient amount of component (a) or an excessive amount of component (b), the resin composition (I) would be poor in adhesion to the fibrous reinforcement and have large cure shrinkage and hence the resulting fiber optic rod would not have sufficient strength. Conversely, with an excessive amount of component (a) or an insufficient amount of component (b), the resin composition (I) (before curing) would have too high a viscosity for easy impregnation and the resulting cured resin would be too stiff for reinforcement.

The amount of component (c) should be more than 5 parts by weight so that the resin composition has low cure shrinkage and good adhesion to the fibrous reinforcement. However, it should not exceed 20 parts by weight; otherwise, the resulting cured product would have poor strength and heat resistance because component (c) is inert to components (a) and (b). The amount of component (d) should be more than 1 part by weight so that ultraviolet curing takes place in a short time. Also, it should be less than 10 parts by weight; an excessive amount would give rise to a brittle or weak cured product due to excess reaction sites for polymerization.

The fiber optic rod (A) of the present invention employs the above-mentioned resin composition for impregnation which is composed of (a) epoxy (meth)acrylate oligomer, (b) monofunctional and/or multifunctional (meth)acrylate, and (c) xylene-formaldehyde resin. This resin composition has low cure shrinkage (at the time of ultraviolet curing) and exhibits good adhesion to the fibrous reinforcement. Thus the resulting fiber optic rod has very good mechanical properties and water resistance.

The fiber optic rod (A) is produced by impregnating, followed by ultraviolet curing, a fibrous reinforcement with a resin composition composed of:

(a) 40-70 parts by weight of epoxy (meth)acrylate oligomer, (b) 60-30 parts by weight of reactive diluent of monofunctional and/or multifunctional (meth)acrylate, (c) 5-20 parts by weight of xylene-formaldehyde resin, and (d) 1-10 parts by weight (for 100 parts by weight of the total amount of (a), (b), and (c) of ultraviolet-sensitive polymerization initiator.

With an insufficient amount of component (a) or an excessive amount of component (b), the resin composition would be poor in adhesion to the fibrous reinforcement and have large cure shrinkage and hence the resulting fiber optic rod would not have sufficient strength. Conversely, with an excessive amount of component (a) or an insufficient amount of component (b), the resin composition (before curing) would have too high a viscosity for easy impregnation and the resulting cured resin would be too stiff for reinforcement. With an insufficient amount of component (c), the resin composition would have high cure shrinkage and poor adhesion to the fibrous reinforcement. With an excessive amount of component (c), the resulting cured product would be poor in strength and heat resistance, as mentioned above. With an insufficient amount of component (d), the resin composition would take a long time for ultraviolet curing or would not cure completely. Conversely, with an amount of component (d) more than 10 parts by weight, the resulting cured product would have low strength due to excess low-molecular-weight compounds, with the curing rate levelled off.

The above-mentioned components (a) to (d) should be mixed such that the resin composition (I) has a viscosity lower than 10 poise (at normal temperature before curing) for easy impregnation into the fibrous reinforcement.

The amount of component (c) should be more than 5 parts by weight so that the resin composition has low cure shrinkage and good adhesion to the fibrous reinforcement. However, it should not exceed 20 parts by weight; otherwise, the resulting cured product would have poor strength and heat resistance because component (c) is inert to components (a) and (b). The amount of component (d) should be more than 1 part by weight so that ultraviolet curing takes place in a short time. Also, it should be less than 10 parts by weight; an excessive amount would give rise to a brittle or weak cured product due to excess reaction sites for polymerization.

The fiber optic rod (A) is made with a fibrous reinforcement impregnated with a resin. The fibrous reinforcement is not specifically limited so long as it has sufficient strength and is transparent to ultraviolet rays to cure the resin. Its preferred examples include glass fiber, polyolefin fiber, polyacrylate fiber, and nylon fiber. The amount of the resin composition (I) to be impregnated into the fibrous reinforcement is not specifically limited; a preferred amount is 20-50 wt % of the total weight of the fiber optic rod.

According to the process of the present invention, the fibrous reinforcement is impregnated with the resin composition (I) (followed by forming, if necessary), and then irradiated with ultraviolet rays. In this way it is possible to produce the fiber optic rod efficiently which has good mechanical properties (such as tensile strength and flexural modulus) and good moisture resistance and chemical resistance because of the integrally bonded fibrous reinforcement and resin composition.

The following is a detailed description of the structure and production of the fiber optic rod (B).

The fiber optic rod (B) is made with the resin composition (II) which contains, as the essential component ($a_1$), acid anhydride-modified epoxy (meth)acrylate oligomer. This oligomer is obtained by reaction between epoxy (meth)acrylate oligomer and organic acid intramolecular anhydride. The epoxy (meth)acrylate oligomer is an addition product of an epoxy compound with (meth)acrylic acid which has two or more (meth)acryloyl groups in the molecule and a number-average molecular weight of about 500-5000. The epoxy compound includes bisphenol-A type epoxy compounds (synthesized from bisphenol-A and epichlorohydrin), phenol-novolak type epoxy compounds, and bisphenol-F type epoxy compounds. Addition of (meth)acrylic acid to these epoxy compounds opens the epoxy ring, causing the (meth)acryloyl group to be introduced and the hydroxyl group to be formed. Reaction of this hydroxyl group with an organic acid anhydride forms an ester carboxylic acid. If the acid anhydride is an intramolecular acid anhydride, it is possible to introduce a bulky ester carboxylic acid into the epoxy (meth)acrylate oligomer. This leads to low ultraviolet cure shrinkage and improved adhesion to the fibrous reinforcement.

Preferred example of the organic acid intramolecular anhydride include maleic anhydride, succinic anhydride, itaconic anhydride, citraconic anhydride, phthalic anhydride, tetrahydrophthalic anhydride, and trimellitic anhydride, which may have substituent groups on their basic skeleton. They may be used alone or in combination with one another. For modification with the acid anhydride to be effective for cure shrinkage reduction and improved adhesion, it is desirable that more than 30 mol % (preferably more than 50 mol %) of the hydroxyl group in the epoxy (meth)acrylate oligomer be modified with the acid anhydride.

The monofunctional and/or multifunctional (meth)acrylate as component (b) is a reactive diluent. It functions as a diluent (or solvent) in the resin composition (II) before curing and, upon irradiation with ultra-violet rays, copolymerizes with the acid anhydride-modified epoxy (meth)acrylate oligomer as component ($a_1$) to form a component of the cured product. It should meet the requirements for low viscosity to promote the impregnation of the resin composition (II), small cure shrinkage, and ability to give a high-strength cured product. Its preferred examples include monofunctional (meth)acrylates and multifunctional (meth)acrylates which have been exemplified above as the constituent of the resin composition (I).

The ultraviolet-sensitive polymerization initiator as component (d) is not specifically limited so long as it generates radicals by cleavage upon irradiation with ultraviolet rays. Its preferred examples include those compounds exemplified above as the constituent of the resin composition (I).

The fiber optic rod (B) is produced by impregnating an ultraviolet transmitting fibrous reinforcement with the resin composition (II) composed essentially of 40–70 parts by weight of component ($a_1$), 60–30 parts by weight of component (b), 5–20 parts by weight of component (c), and 1–10 parts by weight of component (d) for 100 parts by weight of the total amount of components (a), (b), and (c), and integrally curing the resin composition (II) by irradiation with ultraviolet rays. Examples of the fibrous reinforcement include glass fiber, polyolefin fiber, polyacrylate fiber, nylon fiber, and aramide fiber, which are not limitative.

With an insufficient amount of component ($a_1$) or an excessive amount of component (b), the resin composition (II) would be poor in adhesion to the fibrous reinforcement and have large cure shrinkage and hence the resulting fiber optic rod would not have sufficient strength. Conversely, with an excessive amount of component ($a_1$) or an insufficient amount of component (b), the resin composition (II) (before curing) would have too high a viscosity for easy impregnation and the resulting cured resin would be too stiff for reinforcement.

The amount of component (c) should be more than 5 parts by weight so that the resin composition has low cure shrinkage and good adhesion to the fibrous reinforcement. However, it should not exceed 20 parts by weight; otherwise, the resulting cured product would have poor strength and heat resistance because component (c) is inert to components ($a_1$) and (b). The amount of component (d) should be more than 1 part by weight so that ultraviolet curing takes place in a short time. However, an excess amount would give rise to a weak cured product due to excess reaction sites for polymerization.

The resin composition (II) is composed of the above-mentioned essential three components ($a_1$), (b) and (c); but it may contain an additional resin such as epoxy resin, acrylic resin, and silicone resin in an amount not harmful to the curing performance and the properties of the cured product. Such additional resins should be miscible with the components ($a_1$) and (b) so as not to aggravate the properties of the cured product.

The fiber optic rod (B) is produced by impregnating an ultraviolet transmitting fibrous reinforcement with the resin composition (II) composed essentially of 30–70 parts by weight of acid anhydride-modified epoxy (meth)acrylate oligomer as component ($a_1$), 70–30 parts by weight of monofunctional and/or multifunctional (meth)acrylate as component (b), and 1–10 parts by weight of ultraviolet-sensitive polymerization initiator as component (d) for 100 parts by weight of the total amount of components ($a_1$) and (b), and integrally curing the resin composition by irradiation with ultraviolet rays. Examples of the fibrous reinforcement include glass fiber, polyolefin fiber, polyacrylate fiber, and nylon fiber.

With an insufficient amount of component ($a_1$) or an excessive amount of component (b), the resin composition (II) would be poor in adhesion to the fibrous reinforcement and have large cure shrinkage and hence the resulting fiber optic rod would not have sufficient strength. Conversely, with an excessive amount of component ($a_1$) or an insufficient amount of component (b), the resin component (II) (before curing) would have too high a viscosity for easy impregnation and the resulting cured resin would be too stiff for reinforcement.

With an insufficient amount of component (d), the resin composition would take a long time for ultraviolet curing or would not cure completely. Conversely, with an amount of component (d) more than 10 parts by weight, the resulting cured product would have low strength due to excess low-molecular-weight compounds, with the curing rate levelled off.

The above-mentioned components ($a_1$) to (d) should be mixed such that the resin composition (II) has a viscosity lower than 10 poise (at normal temperature before curing) for easy impregnation into the fibrous reinforcement.

The fiber optic rod (B) of the present invention is made with the resin composition which contains acid anhydride-modified epoxy (meth)acrylate oligomer as the essential component ($a_1$). The resin composition has low cure shrinkage and good adhesion to the fibrous reinforcement, and hence the fiber optic rod (B) exhibits very good mechanical properties and water resistance.

The fiber optic rod (B) is made with a fibrous reinforcement impregnated with a resin. The fibrous reinforcement is not specifically limited so long as it has sufficient strength and is transparent to ultraviolet rays to cure the resin. Its preferred examples include those exemplified above in relation to the fiber optic rod (A).

According to the process of the present invention, the fibrous reinforcement is impregnated with the resin composition (II) (followed by forming, if necessary), and then irradiated with ultraviolet rays. In this way it is possible to produce the fiber optic rod efficiently which has good mechanical properties (such as tensile strength and flexural modulus) and good moisture resistance and chemical resistance because of the integrally bonded fibrous reinforcement and resin composition. The amount of the resin composition (II) to be impregnated into the fibrous reinforcement is not specifically limited; but it should preferably be in the range of 20–50 parts by weight for the total amount of the fiber optic rod (B).

EFFECT OF THE INVENTION

As mentioned above, the present invention provides a fiber optic rod which is formed by impregnating a fibrous reinforcement with a resin composition (I) or (II) which is cured afterwards. The resin composition (I) is composed of (a) epoxy (meth)acrylate oligomer, (b) reactive diluent of monofunctional and/or multifunctional (meth)acrylate, (c) xylene-formaldehyde resin, and (d) ultraviolet-sensitive polymerization initiator. The resin composition (II) is composed of ($a_1$) epoxy (meth)acrylate oligomer modified with organic acid intramolecular anhydride, (b) reactive diluent of monofunctional and/or multifunctional (meth)acrylate, and (d) ultraviolet-sensitive polymerization initiator. The impregnating resin composition has low cure shrinkage and good adhesion to the fibrous reinforcement owing to the combined use of epoxy (meth)acrylate oligomer (a) and xylene-formaldehyde resin (c) or the single use of epoxy (meth)acrylate oligomer modified with organic acid intramolecular anhydride ($a_1$). In this way it is possible to produce the fiber optic rod having good mechanical properties (such as tensile strength and tensile modulus) and water resistance.

According to the process of the present invention, the resin composition (I) composed of the above-mentioned components (a), (b), (c), and (d) in a specific ratio, or the resin composition (II) composed of the above-mentioned components ($a_1$), (b), and (d) in a specific ratio, is impregnated into an ultraviolet-transmitting fibrous reinforcement and cured afterwards by irradiation with ultraviolet rays. The process permits the efficient production of the high-performance fiber optic rod in a short cure time.

EXAMPLES

The invention will be described in more detail with reference to the following examples, which are not intended to restrict the scope of the invention.

EXAMPLE 1

A resin composition was prepared from the following components by uniform mixing.

| (a) bisphenol-A type epoxy acrylate oligomer (having an average molecular weight of about 500) | 60 pbw |
|---|---|
| (b) 1,6-hexanediol diacrylate | 40 pbw |
| (c) xylene-formaldehyde resin having an average molecular weight of 230 ("Nikanol" from Mitsubishi Gas Chemical Co., Ltd.) | 5 pbw |
| (d) 2,2-dimethoxy-2-phenylacetophenone ("Irgacure 651" from Ciba-Geigy Corp.) as an ultraviolet-sensitive polymerization initiator | 3 pbw |

The resin composition was impregnated into E-glass rovings such that the resin accounts for 32 wt % of the total weight of the fiber optic rod after curing. Then, the resin composition was cured by irradiation with ultraviolet rays from a UV lamp (with an output of 160 W/cm). Thus there was obtained a fiber optic rod 1.0 mm in diameter. The physical properties of the fiber optic rod are shown in Table 1. The cure shrinkage of the resin composition (without reinforcement) is also shown in Table 1.

In the following Examples 2 to 5 and Comparative Examples 1 to 4, the same procedure mentioned above was repeated except that the amount and kind of epoxy (meth)acrylate oligomer, reactive diluent, and xylene-formaldehyde resin were changed. The physical properties of the fiber optic rod are shown in Table 1. The cure shrinkage of the resin composition (without reinforcement) is also shown in Table 1.

EXAMPLE 2

| (a) bisphenol-A type epoxy acrylate oligomer (Mw: ca. 500) | 60 pbw |
|---|---|
| (b) 1,6-hexanediol diacrylate | 40 pbw |
| (c) "Nikanol" (Mw: 330) | 5 pbw |
| (d) "Irgacure 651" | 3 pbw |

EXAMPLE 3

| (a) bisphenol-A type epoxy acrylate oligomer (Mw: ca. 500 | 50 pbw |
|---|---|
| (b) isobornyl acrylate | 50 pbw |
| (c) "Nikanol" (Mw: 230) | 5 pbw |
| (d) "Irgacure 651" | 3 pbw |

EXAMPLE 4

| (a) bisphenol-A type epoxy acrylate oligomer (Mw: ca. 500) | 50 pbw |
|---|---|
| (b) 1,6-hexanediol diacrylate | 50 pbw |
| (c) "Nikanol" (Mw: 350) | 5 pbw |
| (d) "Irgacure 651" | 3 pbw |

EXAMPLE 5

| (a) bisphenol-A type epoxy acrylate oligomer (Mw: ca. 500) | 50 pbw |
|---|---|
| (b) 1,9-nonanediol diacrylate | 50 pbw |
| (c) "Nikanol" (Mw: 230) | 10 pbw |
| (d) "Irgacure 651" | 3 pbw |

COMPARATIVE EXAMPLE 1

| (a) bisphenol-A type epoxy acrylate oligomer (Mw: ca. 500) | 60 pbw |
|---|---|
| (b) 1,6-hexanediol diacrylate | 40 pbw |
| (c) none | |
| (d) "Irgacure 651" | 3 pbw |

COMPARATIVE EXAMPLE 2

| (a) bisphenol-A type epoxy acrylate oligomer (Mw: ca. 500) | 60 pbw |
|---|---|
| (b) 1,6-hexanediol diacrylate | 40 pbw |
| (c) "Nikanol" (Mw: 350) | 50 pbw |
| (d) "Irgacure 651" | 3 pbw |

COMPARATIVE EXAMPLE 3

| (a) none | |
|---|---|
| (b) polypropyleneglycol diacrylate | 100 pbw |
| (c) "Nikanol" (Mw: 230) | 10 pbw |
| (d) "Irgacure 651" | 3 pbw |

COMPARATIVE EXAMPLE 4

| (a) bisphenol-A type epoxy acrylate oligomer (Mw: ca. 500) | 80 pbw |
|---|---|
| (b) 2-hydroxy-3-phenoxypropyl acrylate | 20 pbw |
| (c) "Nikanol" (Mw: 350) | 10 pbw |
| (d) "Irgacure 651" | 3 pbw |

TABLE 1

| Example (Comparative Example) | Tensile strength (kg/mm$^2$) | Tensile modulus (kg/mm$^2$) | Cure shrinkage (%) |
|---|---|---|---|
| 1 | 92.4 | 4380 | 8.0 |
| 2 | 91.6 | 4300 | 8.2 |
| 3 | 90.8 | 4330 | 7.5 |
| 4 | 90.8 | 4250 | 8.7 |
| 5 | 91.5 | 4230 | 5.9 |
| (1) | 86.0 | 4150 | 8.9 |
| (2) | — | — | 4.3 |
| (3) | 79.5 | 4080 | 9.5 |
| (4) | — | — | 4.0 |

It is noted from Table 1 that the resin compositions in Examples 1 to 5 pertaining to the present invention have a small cure shrinkage and give rise to cured products having a high tensile strength and modulus. By contrast, the resin compositions in Comparative Examples 1 to 4 have a great cure shrinkage and give rise to cured products having a relatively low tensile strength and modulus. The resin composition in Comparative Example 2 undergoes phase separation (becoming turbid) due to excess Nikanol and hence gives rise to a cured product with poor properties. The resin composition in Comparative Example 4 has such a high viscosity (which cannot be reduced by heating) that it presents difficulties in impregnation into the fibrous reinforcement.

EXAMPLE 6

A resin composition (having a viscosity of 500 cp at 25° C.) was prepared from the following components by uniform mixing.

| | |
|---|---|
| ($a_1$) bisphenol-A type epoxy acrylate oligomer (having an average molecular weight of about 500) modified with maleic anhydride (corresponding to 50 mol % of the hydroxyl group in the molecule) | 40 pbw |
| (b) isobornyl acrylate (reactive diluent) | 60 pbw |
| (d) 2,2-dimethoxy-2-phenylacetophenone ("Irgacure 651" from Ciba-Geigy Corp.) as an ultraviolet-sensitive polymerization initiator | 3 pbw |

The resin composition was impregnated into E-glass rovings such that the resin accounts for 32 wt % of the total weight of the fiber optic rod after curing. Then, the resin composition was cured by irradiation with ultraviolet rays from a UV lamp (with an output of 160 W/cm). Thus there was obtained a fiber optic rod 2.3 mm in diameter. The physical properties of the fiber optic rod are shown in Table 2. The cure shrinkage of the resin composition (without reinforcement) is also shown in Table 2.

In the following Examples 7 to 9 and Comparative Examples 5 to 7, the same procedure mentioned above was repeated except that the amount and kind of acid anhydride-modified epoxy (meth)acrylate oligomer and reactive diluent were changed. The physical properties of the fiber optic rod are shown in Table 2. The cure shrinkage of the resin composition (without reinforcement) is also shown in Table 2.

EXAMPLE 7

| | |
|---|---|
| ($a_1$) bisphenol-A type epoxy acrylate oligomer (Mw: ca. 500) modified with maleic anhydride corresponding to 70 mol % of the hydroxyl group in the oligomer | 50 pbw |
| (b) isobornyl acrylate | 50 pbw |
| (c) "Irgacure 651" | 3 pbw |

EXAMPLE 8

| | |
|---|---|
| ($a_1$) bisphenol-A type epoxy acrylate oligomer (Mw: ca. 500) modified with succinic anhydride corresponding to 70 mol % of the hydroxyl group in the oligomer | 40 pbw |
| (b) isobornyl acrylate | 60 pbw |
| (c) "Irgacure 651" | 3 pbw |

EXAMPLE 9

| | |
|---|---|
| ($a_1$) bisphenol-A type epoxy acrylate oligomer (Mw: ca. 500) modified with maleic anhydride corresponding to 50 mol % of the hydroxyl group in the oligomer | 40 pbw |
| (b) isobornyl acrylate | 50 pbw |
| pentaerythritol tetraacrylate | 10 pbw |
| (d) "Irgacure 651" | 3 pbw |

EXAMPLE 10

| | |
|---|---|
| ($a_1$) bisphenol-A type epoxy acrylate oligomer (Mw: ca. 500) modified with maleic anhydride corresponding to 50 mol % of the hydroxyl group in the oligomer | 40 pbw |
| (b) 1,6-hexanediol diacrylate | 60 pbw |
| (d) "Irgacure 651" | 3 pbw |

COMPARATIVE EXAMPLE 5

| | |
|---|---|
| ($a_1$) unmodified bisphenol-A type epoxy acrylate oligomer (Mw: ca. 500) | 40 pbw |
| (b) 1,6-hexanediol diacrylate | 60 pbw |
| (d) "Irgacure 651" | 3 pbw |

COMPARATIVE EXAMPLE 6

| | |
|---|---|
| ($a_1$) unmodified bisphenol-A type epoxy acrylate oligomer (Mw: ca. 500) | 50 pbw |
| (b) isobornyl acrylate | 40 pbw |
| pentaerythritol tetraacylate | 10 pbw |
| (d) "Irgacure 651" | 3 pbw |

COMPARATIVE EXAMPLE 7

| | |
|---|---|
| ($a_1$) bisphenol-A type epoxy acrylate oligomer (Mw: ca. 500) modified with maleic anhydride corresponding to 50 mol % of the hydroxyl group in the oligomer | 20 pbw |
| (b) isobornyl acrylate | 20 pbw |
| 1,6-hexanediol diacrylate | 60 pbw |
| (d) "Irgacure 651" | 3 pbw |

COMPARATIVE EXAMPLE 8

| | |
|---|---|
| ($a_1$) bisphenol-A type epoxy acrylate oligomer (Mw: ca. 500) modified with maleic anhydride corresponding to 50 mol % of the hydroxyl group in the oligomer | 80 pbw |
| (b) isobornyl acrylate | 20 pbw |
| (d) "Irgacure 651" | 3 pbw |

TABLE 2

| Example (Comparative Example) | Tensile strength (kg/mm$^2$) | Tensile modulus (kg/mm$^2$) | Cure shrinkage (%) |
|---|---|---|---|
| 6 | 89.6 | 4340 | 5.8 |
| 7 | 89.6 | 4310 | 5.6 |
| 8 | 90.0 | 4240 | 6.0 |
| 9 | 94.8 | 4430 | 5.4 |
| 10 | 88.4 | 4350 | 6.4 |
| (5) | 81.6 | 4200 | 8.9 |
| (6) | 87.6 | 4130 | 7.0 |
| (7) | 79.2 | 4100 | 12.6 |

It is noted from Table 2 that the resin compositions in Examples 6 to 10 pertaining to the present invention have a small cure shrinkage and give rise to cured products having a high tensile strength and modulus. By contrast, the resin compositions in Comparative Examples 5 to 7 have a great cure shrinkage and give rise to cured products having a relatively low tensile strength and modulus. The resin composition in Comparative Example 8 has such a high viscosity (which cannot be reduced by heating) that it presents difficulties in impregnation into the fibrous reinforcement.

The impregnating resin in the present invention is composed of specific components as mentioned above, so that it cures in a short time for high productivity and adheres firmly to the fibrous reinforcement with a minimum of cure shrinkage. Thus the present invention permits the efficient production of the fiber optic rod having high strength and toughness and good moisture resistance.

What is claimed is:

1. A fiber optic rod which comprises an ultraviolet transmitting fibrous reinforcement impregnated, followed by curing, with a resin composition composed of, as essential components,
   (a) 40–70 parts by weight of epoxy (meth)acrylate oligomer,
   (b) 60–30 parts by weight of reactive diluent of monofunctional and/or multifunctional (meth)acrylate,
   (c) 5–20 parts by weight of xylene-formaldehyde resin, and
   (d) 1–10 parts by weight (for 100 parts by weight of the total amount of (a), (b), and (c)) of ultraviolet-sensitive polymerization initiator.

2. A fiber optic rod as defined in claim 1, wherein the epoxy (meth)acrylate oligomer is one which is formed by adding (meth)acrylic acid to an epoxy compound and has two or more (meth)acryloyl groups in the molecule and a number-average molecular weight of 500–5000.

3. A fiber optic rod as defined in claim 2, wherein the epoxy compound is at least one species selected from the group consisting of bisphenol-A type epoxy compound, hydrogenated bisphenol-A epoxy compound, modified bisphenol-A type epoxy compound, epoxy compound of (poly)alkylene glycol, and novolak-type epoxy compound.

4. A fiber optic rod as defined in any of claims 1 to 3, wherein the xylene-formaldehyde resin is one which is formed by addition-condensation of m-xylene and formaldehyde and has a number-average molecular weight of 250–700.

5. A process for producing a fiber optic rod which comprises impregnating an ultraviolet transmitting fibrous reinforcement with a resin composition composed of, as essential components,
   (a) 40–70 parts by weight of epoxy (meth)acrylate oligomer,
   (b) 60–30 parts by weight of reactive diluent of monofunctional and/or multifunctional (meth)acrylate,
   (c) 5–20 parts by weight of xylene-formaldehyde resin, and
   (d) 1–10 parts by weight (for 100 parts by weight of the total amount of (a), (b), and (c)) of ultraviolet-sensitive polymerization initiator,
and curing the resin composition by irradiation with ultraviolet rays.

6. A process for producing a fiber optic rod as defined in claim 5, wherein the epoxy (meth)acrylate oligomer is one which is formed by adding (meth)acrylic acid to an epoxy compound and has two or more (meth)acryloyl groups in the molecule and a number-average molecular weight of 500–5000.

7. A process for producing a fiber optic rod as defined in claim 6, wherein the epoxy compound is at least one species selected from the group consisting of bisphenol-A type epoxy compound, hydrogenated bisphenol-A epoxy compound, modified bisphenol-A type epoxy compound, epoxy compound of (poly)-alkylene glycol, and novolak-type epoxy compound.

8. A process for producing a fiber optic rod as defined in any of claims 5 to 7, wherein the xylene-formaldehyde resin is one which is formed by addition-condensation of m-xylene and formaldehyde and has a number-average molecular weight of 250–700.

9. A fiber optic rod which comprises an ultraviolet transmitting fibrous reinforcement impregnated, followed by curing, with a resin composition composed of, as essential components,
   ($a_1$) 30–70 parts by weight of acid anhydride-modified epoxy (meth)acrylate obtained by reaction between epoxy (meth)acrylate oligomer and organic acid intra-molecular anhydride,
   (b) 70–30 parts by weight of reactive diluent of monofunctional and/or multifunctional (meth)acrylate,
   (d) 1–10 parts by weight (for 100 parts by weight of the total amount of (a) and (b)) of ultraviolet-sensitive polymerization initiator.

10. A fiber optic rod as defined in claim 9, wherein the acid anhydride-modified epoxy (meth)acrylate is one which is obtained by the reaction of an organic acid intramolecular anhydride with an oligomer having two or more (meth)acryloyl groups in the molecule and a number-average molecular weight of 500–5000 which is formed by adding (meth)acrylic acid to an epoxy compound.

11. A fiber optic rod as defined in claim 9 or 10, wherein the acid anhydride-modified epoxy (meth)acrylate is one which is obtained by modifying more than 30 mol % of the hydroxyl groups in epoxy (meth)acrylate oligomer with an acid anhydride.

12. A process for producing a fiber optic rod which comprises impregnating an ultraviolet transmitting fibrous reinforcement with a resin composition composed of, as essential components,
   ($a_1$) 30–70 parts by weight of acid anhydride-modified epoxy (meth)acrylate obtained by reaction between epoxy (meth)acrylate oligomer and organic acid intramolecular anhydride,
   (b) 70–30 parts by weight of reactive diluent of monofunctional and/or multifunctional (meth)acrylate,
   (d) 1–10 parts by weight (for 100 parts by weight of the total amount of (a) and (b)) of ultraviolet-sensitive polymerization initiator,
and curing the resin composition by irradiation with ultraviolet rays.

13. A process for producing a fiber optic rod as defined in claim 12, wherein the acid anhydride-modified epoxy (meth)acrylate is one which is obtained by the reaction of an organic acid intramolecular anhydride with an oligomer having two or more (meth)acryloyl groups in the molecule and a number-average molecular weight of 500–5000 which is formed by adding (meth)acrylic acid to an epoxy compound.

14. A process for producing a fiber optic rod as defined in claim 12 or 13, wherein the acid anhydride-modified epoxy (meth)acrylate is one which is obtained by modifying more than 30 mol % of the hydroxyl groups in epoxy (meth)acrylate oligomer with an acid anhydride.

* * * * *

UNITED STATES PATENT AND TRADEMARK OFFICE
CERTIFICATE OF CORRECTION

PATENT NO. : 5,363,468
DATED : NOVEMBER 8, 1994
INVENTOR(S) : EIICHIRO YOSHIKAWA ET AL

It is certified that error appears in the above-indentified patent and that said Letters Patent is hereby corrected as shown below:

Column 7, lines 5-6, delete "5-20 parts by weight of component c";

line 8, delete "and (c),";

lines 23-28, delete in their entirety;

line 29, "nent (c) is inert to components ($a_1$) and (b). The" should read "The";

line 36, "(b) and (c);" should read "(b) and (d);".

Signed and Sealed this

Twenty-seventh Day of June, 1995

Attest:

BRUCE LEHMAN

Attesting Officer    Commissioner of Patents and Trademarks